United States Patent [19]

Slegel et al.

[11] Patent Number: 6,115,829
[45] Date of Patent: Sep. 5, 2000

[54] COMPUTER SYSTEM WITH TRANSPARENT PROCESSOR SPARING

[75] Inventors: Timothy John Slegel, Staatsburg; Robert E. Murray, Kingston, both of N.Y.

[73] Assignee: International Business Machines Corporation, Armonk, N.Y.

[21] Appl. No.: 09/070,433

[22] Filed: Apr. 30, 1998

[51] Int. Cl.[7] .......................... H02H 3/05; H03K 19/003; H04B 1/74

[52] U.S. Cl. .............................. 714/10; 714/13; 712/227; 712/228

[58] Field of Search .................................. 714/10, 9, 11, 714/13, 16, 20; 712/227, 228

[56] References Cited

U.S. PATENT DOCUMENTS

| | | | |
|---|---|---|---|
| 4,710,926 | 12/1987 | Brown et al. | 714/4 |
| 4,823,256 | 4/1989 | Bishop et al. | 714/10 |
| 4,852,092 | 7/1989 | Makita | 714/17 |
| 5,159,597 | 10/1992 | Monahan et al. | 714/2 |
| 5,233,618 | 8/1993 | Glider et al. | 714/6 |
| 5,345,567 | 9/1994 | Hayden et al. | 712/228 |
| 5,428,779 | 6/1995 | Allegrucci et al. | 709/108 |
| 5,504,859 | 4/1996 | Gustafson et al. | 714/228 |
| 5,530,946 | 6/1996 | Bouvier et al. | 714/23 |
| 5,584,617 | 12/1996 | Houser | 408/1 R |
| 5,694,617 | 12/1997 | Webb et al. | 710/40 |
| 5,802,359 | 9/1998 | Webb et al. | 712/227 |

OTHER PUBLICATIONS

J.O. Becker, Guest Editor, "The 3B20D Processor & DMERT Operating System", The Bell System Technical Journal, vol. 62, No. 1, Part 2, Jan. 1983, pp. 167–428.

"A Local Sparing Design Methodology For Fault Tolerant Multiprocessors" by Dutt et al., Computer Math. Applications (UK), vol. 34, No. 11, Dec. 1997, p. 25–50.

"Organizational Redundancy For A Parallel Processor Machine" by Brantley et al., IBM Technical Disclosure Bulletin, vol. 28, No. 1, Jun. 1985, p. 417–418.

"A Fault–Tolerant Multi–Transputer Architecture" by Kumar et al., Microprocessors and Microsystems, vol. 17, No. 1, Jan./Feb. 1993, p. 75–81.

"On Reconfiguration Latency In Fault–Tolerant Systems" by Kim et al., 1995 IEEE Aerospace Applications Conference Proceedings, vol. 1, Feb. 4–11, 1995, Snowmass at Aspen, CO, IEEE 95TH8043 p. 287–301.

"1994 IEEE International Conference on Wafer Scale Integration" by Lea et al., Proceedings of the 6th Annual Int. Conference on Wafer Scale Integration, 1994, p. 401.

*Primary Examiner*—Dieu-Minh T. Le
*Attorney, Agent, or Firm*—Lynn L. Augspurger

[57] ABSTRACT

A computer which has multiple central processing units where at least one of the processors is a spare and unused for normal system operation, provides a mechanism for transferring the micro-architected state of a checkstopped processor to a spare processor. Each processor has a set of registers in the central processing unit where the micro-architected state of the processor is kept and these registers are accessible by millicode or microcode running on that processor. A checkstop of a processor is detected by the system, the micro-architected state of that processor is extracted and returned to the system where that state can be loaded into a spare processor in the system and processing resumed without interruption.

10 Claims, 2 Drawing Sheets

COMPUTER SYSTEM WITH TRANSPARENT PROCESSOR SPARING

CROSS REFERENCE TO RELATED APPLICATIONS

The present application related to the following co-pending patent application which is filed concurrently herewith. "Transparent Processor Sparing" filed Apr. 30, 1998 under U.S. Ser. No. 09/070,434. This co-pending application and the present application are owned by one and the same assignee, International Business Machines Corporation of Armonk, N.Y.

FIELD OF THE INVENTION

This invention is related to computer systems and particularly to multi-processors which may implement our transparent central processor (CP) sparing which is transparent to the user.

BACKGROUND OF THE INVENTION

Various computer manufacturers have what could be considered to be an interest in high availability systems. Typically, these systems implement a hardware error recovery mechanism to automatically, and transparently, recover from most transient errors. However, this error recovery will not be successful in most cases of solid, or non-transient, errors. Various mechanisms developed within IBM such as Processor Availability Facility (PAF), Concurrent CP Sparing, System Assist Processor (SAP) Reassignment provide for the recovery of a failed processor's work on a different processor. All the above prior mechanism have limitations.

Note that Amdahl has used the term "dynamic" in conjunction with their CP Sparing. However, to the best of our knowledge their implementation is more analogous to a combination of our the IBM Processor Availability Facility (PAF) and IBM's (IBM and S/390 are trademarks of International Business Machines Corporation) Concurrent CP Sparing as currently implemented on the IBM 9672 G4 than what is being described here as transparent processor sparing.

IBM's S/390 division, Hitachi, and Fujitsu (Amdahl) are those companies which are very active in this arena currently, but other competitors such as those who may attempt to use other kinds of processors, such as HP and Intel, may be interested in employing our development once they understand it if they attempt to produce mainframe-class systems. When a CP in a multiprocessor system encounters an error and enters a checkstop state, it is very desirable to not lose the work being done on that processor but instead move that work to another processor that is still operating in the system. In an S/390 system, several methods have been previously used to attempt to solve this problem:

Processor Availability Facility (PAF) moves the S/390 architected state of the failed processor to another currently operating (on-line) processor in the system with the help of the Operating System (OS). However, it has a several major limitations: 1) Since the mechanism uses the OS to perform the function, the customer is aware that the incident occurred, 2) if the CP happened to be executing in millimode at the time of the checkstop, it is not possible to invoke PAF since PAF only works at the S/390 architected state, not the micro-architected state which is a capability of G4 type S/390 systems (see e.g. U.S. Pat. No. 5,584,617) and 3) the customer has still lost the use of one of his CPs.

Concurrent CP Sparing as currently implemented on the IBM 9672 G4 models use a spare processor so that the customer does not lose access to one of his CPs when a checkstop occurs. It is used in conjunction with PAF. However, the customer is fully aware that a processor had a problem and it requires customer intervention (VARY a CP online) in some environments. It also may not work in some Logical Partition (LPAR) environments where certain processors are dedicated to certain partitions. Finally, it is based upon PAF for the application recovery and PAF will not be successful if the CP checkstop occurred while the processor was executing in millimode.

Although not directly related to preserving CP function, IBM's System Assist Processor (SAP) Re-assignment as currently implemented on the IBM 9672 G4 models use a spare processor to take over when a System Assist Processor (SAP) encounters an error. This mechanism can not be used for normal, non-SAP, CPs.

So to summarize, the mechanisms stated above work well as a whole but have limitations.

They do not work if a normal CP (non-SAP) was executing in millimode at the time of the failure.

All the above solutions are visible to the customer who then may be concerned that his hardware is "unreliable".

Concurrent CP Sparing may not work in certain LPAR environments (e.g. dedicated uni-processor environments).

They will not work for uni-processor configurations even if a spare CP is available.

SUMMARY OF THE INVENTION

Our invention provides a mechanism enabling the micro-architected state of a checkstopped processor can be transferred to a spare processor in the system. The transfer is accomplished by the system using a hardware instruction built into the processor that is useable only by millicode. In addition, the transfer is initiated and managed by Licensed Internal Code (LIC) sequences. This code runs on both an external Service Element (SE) and as millicode on the processors themselves.

It will be recognized that we have provided a solution whereby the action of the system is completely transparent to the Operating System and to the users of the system. In fact, they are not even aware that a processor had a non-recoverable error.

These and other improvements are set forth in the following detailed description. For a better understanding of the invention with advantages and features, refer to the description and to the drawings.

(Note: For convenience of illustration, FIGURES may be separated in parts and as a convention we place the top of the

DETAILED DESCRIPTION OF THE INVENTION

Our CP sparing moves the micro-architected state of a processor that has failed, to another spare processor in the system transparently and dynamically. By micro-architected state we mean the complete state of the processor as visible by millicode. This is contrasted with the S/390-architected state, or more generally, instruction-set architected state which is the state of the processor visible to the Operating System and programmers. The existing PAF mechanism moves the S/390-architected state to a spare processor. Our invention allows the micro-architected state to be moved "under-the-covers" by a combination of Service Element (SE) code, i390 code and millicode. The fact that this movement has happened is not visible to the operating system or application code that may be running.

For transparent CP sparing to work, there must be at least one spare processor in the system. This would be a CP that is idle and is not visible to the operating system or to the customer in general. It would be typically executing a millicode loop, or some other LIC code at the architected level (i390 code in the case of our system), and simply waiting to be "awakened" if it is needed to take over from a failed processor.

Another requirement is each processor is assigned a unique Logical identifier (CPID) and a unique Physical identifier (CPID). The Logical and Physical CPIDs are not necessarily the same for any given processor. The operating system and the customer's view of his system is only through the Logical CPID for a processor; they do not even have to know that a Physical CPID exists. The capability of the spare processor to assume the Logical CPID of the checkstopped processor is critical to making the CP sparing operation appear transparent to the Operating System software. Generally, the hardware only knows about the Physical CPID for a processor. Code that runs on the processor below the instruction-set architected level (millicode, i390 code, etc.) may utilize one or both of the two types of CPIDs depending on the exact usage. Note that the term Logical CPID used here, must not be confused with LPAR's usage of the same term which is at an even higher level.

Figure 1:
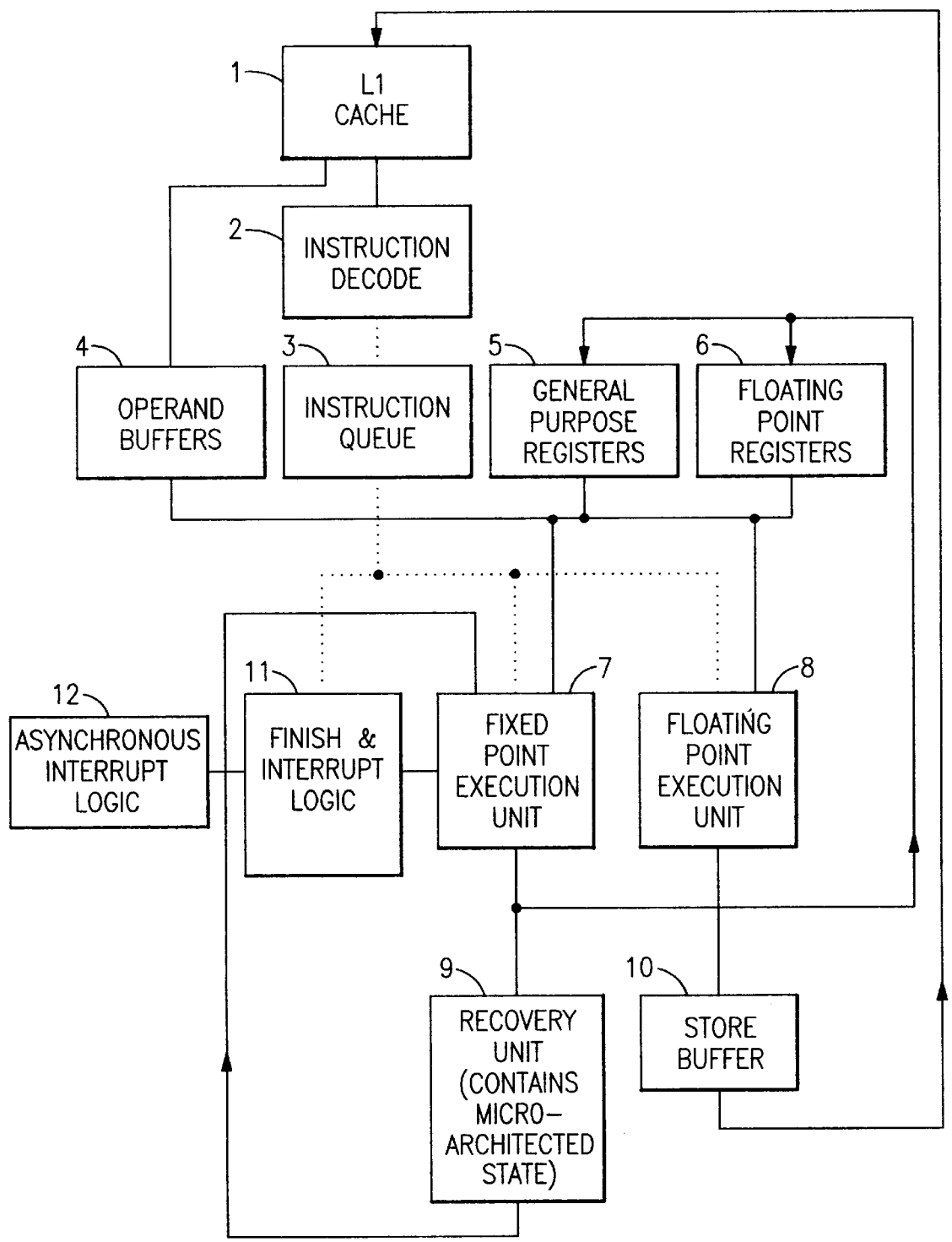
FIG. 1 shows schematically an overview of the preferred embodiment and particularly shows a block diagram illustrating the main components of a typical central processor (CP) in accordance with a preferred specific embodiment of the Invention. Of particular interest is our Recovery Unit (R-unit) which holds the micro-architected state of the system processor at all times.

Our preferred embodiment of the system of FIG. 1 demonstrates a new hardware mechanism for implementing our method of transparent CP sparing which is also is dynamic and which solves all the above limitations. The parts of our preferred embodiment include: 1) the general concept and, 2) the introduction of a new hardware instruction called LOAD R-UNIT STATE (LRUS) in our method for millicode use to implement Transparent CP Sparing, and it will become apparent after understanding these features that they will support various LIC algorithms that implement and add additional enhancements to the basic concept. In our preferred embodiment we would use the preferred vertical microcode routines of modern IBM ESA/390 systems known as millicode which runs on millimode enabled systems; however, it is also be possible to use horizontal microcode on a different processor which implements our preferred embodiment on a different processor. It would also be possible to implement this invention in a totally different architecture (non-S/390) using microcode, or even pure hardware. So, generically, our invention employs microcode, both horizontal and vertical microcode which we know as millicode, but we do prefer to use our invention in the environment where it is best implemented, those ESA/390 systems which provide for Millimode operation as described in U.S. Pat. No. 5,694,617 and first commercially implemented by IBM at the G4 level. Of course our invention will be useable in future generations which enable millimode operations.

The following is a description, in high-level terms, of how our form of Transparent CP Sparing is accomplished:

1. A processor encounters a hardware-detected error and checkstops, typically after attempting to retry the operation itself. Note the checkstop here is in hardware terms. It should not be confused with the S/390 architecture term of checkstop which will never be presented to the Operating System when Transparent CP Sparing is successful.

2. The SE is notified of the CP checkstop. It scans the value of all latches out of the failed processor. Note that in certain implementations, this could be accomplished by hardware automatically dumping its state into System Area storage. The term System Area storage refers to an area of memory accessible by LIC code (millicode in our case) but not visible to the Operating System or customer.

3. The critical components of the checkpointed micro-architected state are extracted from all the latches on the failed processor by the SE code. An alternative implementation would be the entire raw scan-ring is returned to some running processor on the system via the SE or pure hardware. This processor is then responsible for extracting the required micro-architected state. Our invention does require the entire micro-architected state be in one logical location on the failed processor (not necessarily physically close together) so that all applicable registers may be loaded via a single hardware instruction. In our preferred processor, this is the contents of all R-unit registers and no other information from other latches is required. This structure of registers is described in U.S. Pat. No. 5,504,859 entitled, "Data processor with enhanced error recovery." This patent is incorporated by reference.

4. The micro-architected state is then sent back by the SE and is stored in System Area storage.

5. A spare CP in the system is notified, by an inter-processor communication mechanism, that it is supposed to replace the processor that has failed.

6. The spare processor can make any required changes to the transferred micro-architected state in storage before it is loaded. An example of this is if the Physical CPID is stored as part of the micro-architected state, then it must be modified to reflect the Physical CPID of the processor that is going to receive the new micro-architected state. An alternative implementation would be to have the SE make the required changes to the micro-architected state before storing it into System Area storage.

7. This spare CP than executes a LOAD R-UNIT STATE (LRUS) instruction with the storage operand being the location in system area of the micro-architected state of the failed processor.

8. The LRUS instruction executes on the spare CP and loads the micro-architected state from storage into itself.

9. At the completion of the LRUS, I-fetching and execution begins at the instruction address indicated in the micro-architected state. Any instruction-set architected code running on the system can not even detect that a Transparent CP Sparing event has occurred.

A new LRUS instruction is used in our Transparent CP Sparing is the LRUS instruction. This instruction, usable only by millicode, loads the entire micro-architected state of the processor in one atomic instruction. Using multiple millicode instructions that are non-atomic will not work since it is impossible to load the final pieces of a processor's state and still remain in control to resume executing the code from the failed processor. In other words, more than a single piece of the processor's state must be modified by the last instruction of the millicode routine that is trying to restore the state.

In the preferred embodiment, all 256 R-unit registers are loaded from System Area storage. The registers are loaded sequentially, a double-word at a time, starting at the storage location specified in the operand field of the LRUS instruction. In our implementation the exact length of the storage operand is 1536 bytes but this can vary for other implementations. After the last R-unit register has been loaded, the processor performs a serialization interrupt which restarts instruction fetching and execution from the state specified by the new values in the R-unit registers. Other implementations of the LRUS instruction are possible that perform the same result.

The fact that an LRUS instruction produced this state is in general not visible to any code (whether millicode, i390 code, or ESA/390 code) which then begins execution. The code performing the LRUS operation may, however, modify the new state prior to issuing the LRUS so as to cause certain events to occur (such as refresh Time Of Day logic) when operation continues in the new state.

Note that the implementation and use of our Transparent CP Sparing does not preclude the use of earlier recovery techniques such as PAF and SAP Reassignment. Generally, Transparent CP Sparing will be attempted first in the case of a CP checkstop on a non-SAP CP. However, if no spare processors are available, PAF will be attempted.

Turning now to our invention in greater detail, it will be seen from FIG. 1 which illustrates our preferred embodiment in which a typical processor is shown and the components relevant to this invention. An L1 cache (1) containing the most recently used instruction and operand data supplies instruction text to the instruction decode logic (2). This logic parses the instruction and passes the relevant components to the instruction queue (3) where it is held until it is ready to be executed. When an instruction has been decoded, the operand address(es) is calculated and the operand(s) for that instruction are fetched from the L1 cache and held in the operand buffers (4) until it is ready for execution. The general purpose registers (5) and floating-point registers (6) also supply operands to the execution unit. When all operands for a given instruction are available, the fixed-point execution unit (7) or floating-point execution unit (8) then typically executes some function on the operand(s) for that instruction. When the execution of that instruction is finished, the results of that instruction are written to the general purpose registers (5) or floating-point registers (6). If it was a store-type instruction the results are instead put into a store buffer (10) where they will eventually be written back to the L1 cache (1). In parallel with writing results to the general purpose registers (5) or floating-point registers (6), results are also written to registers in the recovery unit (9) which contains the complete micro-architected state of the processor at any given time. Note that certain control registers may have local shadow copies within the instruction unit, execution unit, or other areas of the processor but the master copy of these control registers is always the recovery unit (9). In parallel with all the above operations, the finish and interrupt logic (11) is continuously monitoring and controlling the completion of the execution of all instructions and the writing of their results. Also, the asynchronous interrupt logic (12) is continually monitoring for pending asynchronous interrupts and presenting them to the finish and interrupt logic (11).

The recovery unit (9) and L1 cache (1) are continually checking the results obtained by the fixed-point execution unit (7) and floating-point unit (8) and if they detect any error, they will force the processor into a hardware recovery action. The recovery unit (9) is the area of the processor that contains the micro-architected state that accessible by millicode.

Figure 2:
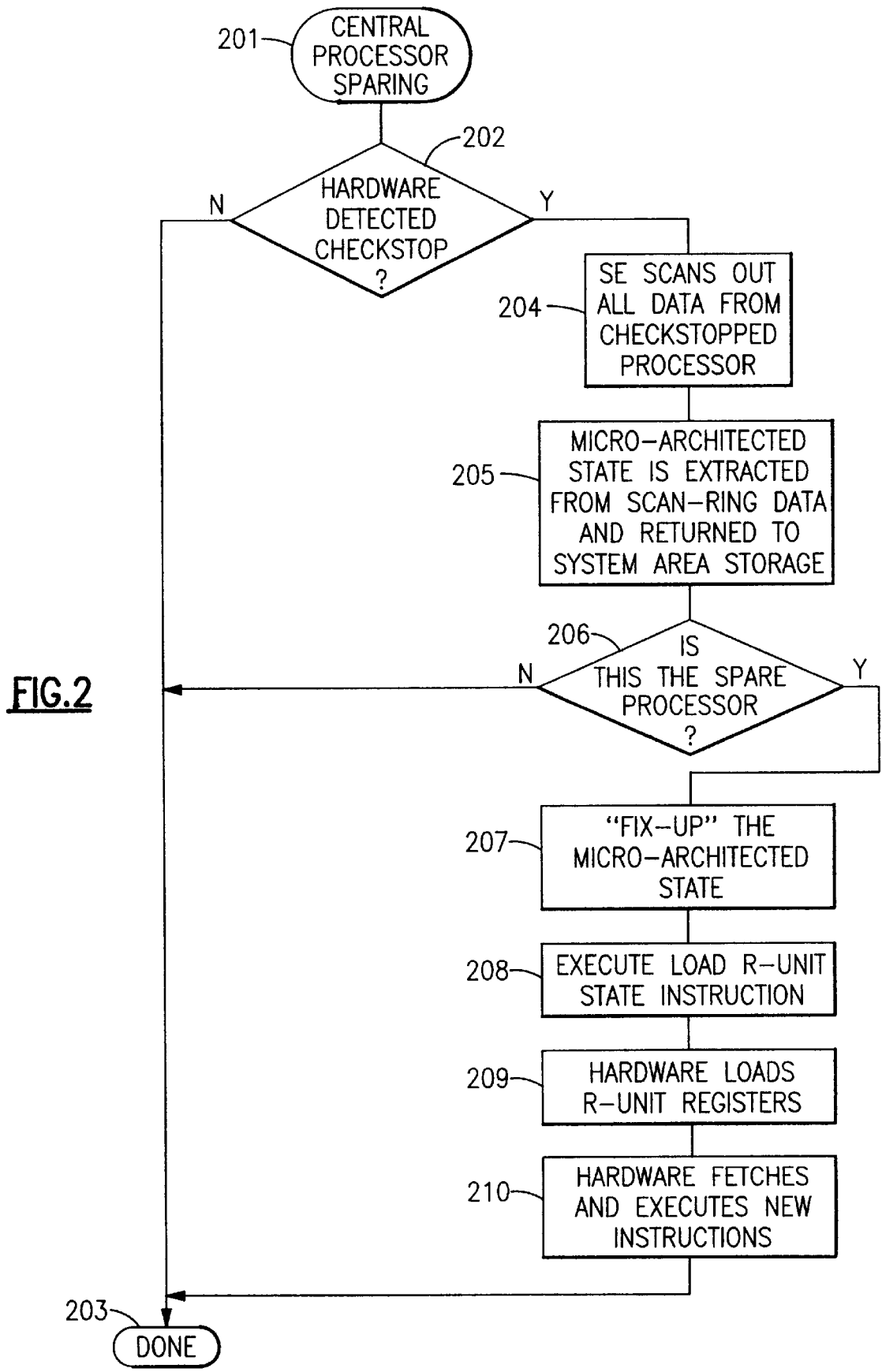
FIG. 2 shows a flow diagram of the hardware, SE code, and millicode sequences used in implementing the invention.

FIG. 2 illustrates a flow diagram of our method for implementation of transparent central processor sparing (201). The multiprocessor system hardware continually monitors if any CP checkstops have occurred (202). If they have not, then no further action in relation to CP sparing is required and we are done (203). If however, a checkstop has occurred the service element will scan out all latch data from the checkstopped processor (204). The service element then extracts the micro-architected state from the scan-ring data and returns it to the system by putting it into system area storage (205). In our preferred embodiment this accomplished by having the SE transfer it to the master SAP who then stores it into system area storage. Now the spare processor which is going to assume the role of the checkstopped processor is notified through an interprocessor communication mechanism. If this is not the processor that will be the spare being used, then there is nothing more to do for this processor (206). Otherwise, the spare processor "fixes-up" the micro-architected state as required (207) which will include, but is not limited to, modifying the value in the physical CPID field of the micro-architected state.

The millicode executing on the spare processor then executes a LOAD R-UNIT STATE instruction (208). The hardware on the spare processor then loads all R-unit registers from storage (209) in a single, atomic, operation. The processor hardware then resumes fetching and executing instructions (210) from the new instruction stream as specified in the micro-architected state that was just loaded.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A multiprocessor computer system, comprising
a plurality of processors forming multiple central processing units where at least a spare processor of the processors is a spare and unused for normal system operation, and wherein each processor of said plurality of processors has a set of registers in the central processing unit with latches where all components of the micro-architected state of that processor is kept and these registers are accessible by microcode running on that processor,
means for detecting a checkstop occurrence of said processor indicating that processor is a checkstopped processor and a service element for extracting the micro-architected state of that checkstopped processor and returning the micro-architected state of that checkstopped processor to the system where that state can be loaded into said spare processor in the system and processing transparently resumed without interruption and wherein the service element to the system has the capability to analyze the state of all latches having a component of the micro-architected state of said checkstopped processor and extract the micro-architected state from those latches and transfer the micro-architected state of the checkstopped processor to system area storage accessible to a spare processor in the system.

2. A multiprocessor computer system according to claim 1 wherein each said checkstopped processor of the system is provided with a service element having the capability to analyze the state of all latches in said checkstopped processor and the capability to extract the micro-architected state from those latches and to transfer the micro-architected state to that system area storage addressable by said spare processor in the system with a process including:

analyzing with said service element the state of all latches in said checkstopped processor and extracting the micro-architected state from those latches and transferring said micro-architected state to a system area storage accessible at all times of normal operation to said spare processor in the system which is made active during transparently resuming processing in the multiprocessor computer system with said spare processor functioning as one of the active processors in normal system operation without interruption.

3. A multiprocessor computer system according to claim 1 wherein a hardware mechanism transfers a complete scan-ring of a checkstopped processor to said system area storage made accessible to said spare processor in the system during normal operation after transfer of said complete scan-ring of said checkstopped processor.

4. A multiprocessor computer system according to claim 3 wherein said hardware mechanism notifies said spare processor to assume the role of the checkstopped processor and to access said system area storage made accessible to said spare processor in the system during normal operation after scan-ring transfer.

5. A multiprocessor computer system according to claim 4 wherein said micro-architected state for said checkstopped processor is modified in system area storage so that after modification it will be ready to execute on the spare processor.

6. A multiprocessor computer system according to claim 4 wherein said micro-architected state for said checkstopped processor is modified with a service element to the system before returning it into system area storage so that it will be ready to execute on the spare processor.

7. A multiprocessor computer system according to claim 4 wherein said micro-architected state is loaded in the spare processor from system area storage into registers of said spare processor in one atomic operation.

8. A multiprocessor computer system according to claim 7 wherein after said micro-architected state is loaded in the spare processor from system area storage into registers of said spare processor in one atomic operation, said spare processor begins fetching and executing instructions according to the micro-architected state just loaded into the processor.

9. A multiprocessor computer system according to claim 7 wherein said registers and latches having a component of the micro-architected state of said processor are in a recovery Unit (R-unit) which holds the micro-architected state of the system processor at all times.

10. A multiprocessor computer system according to claim 7 wherein said microcode is vertical microcode in millicode form for millioperations of said multiprocessor computer system.

* * * * *